Patented Mar. 6, 1951

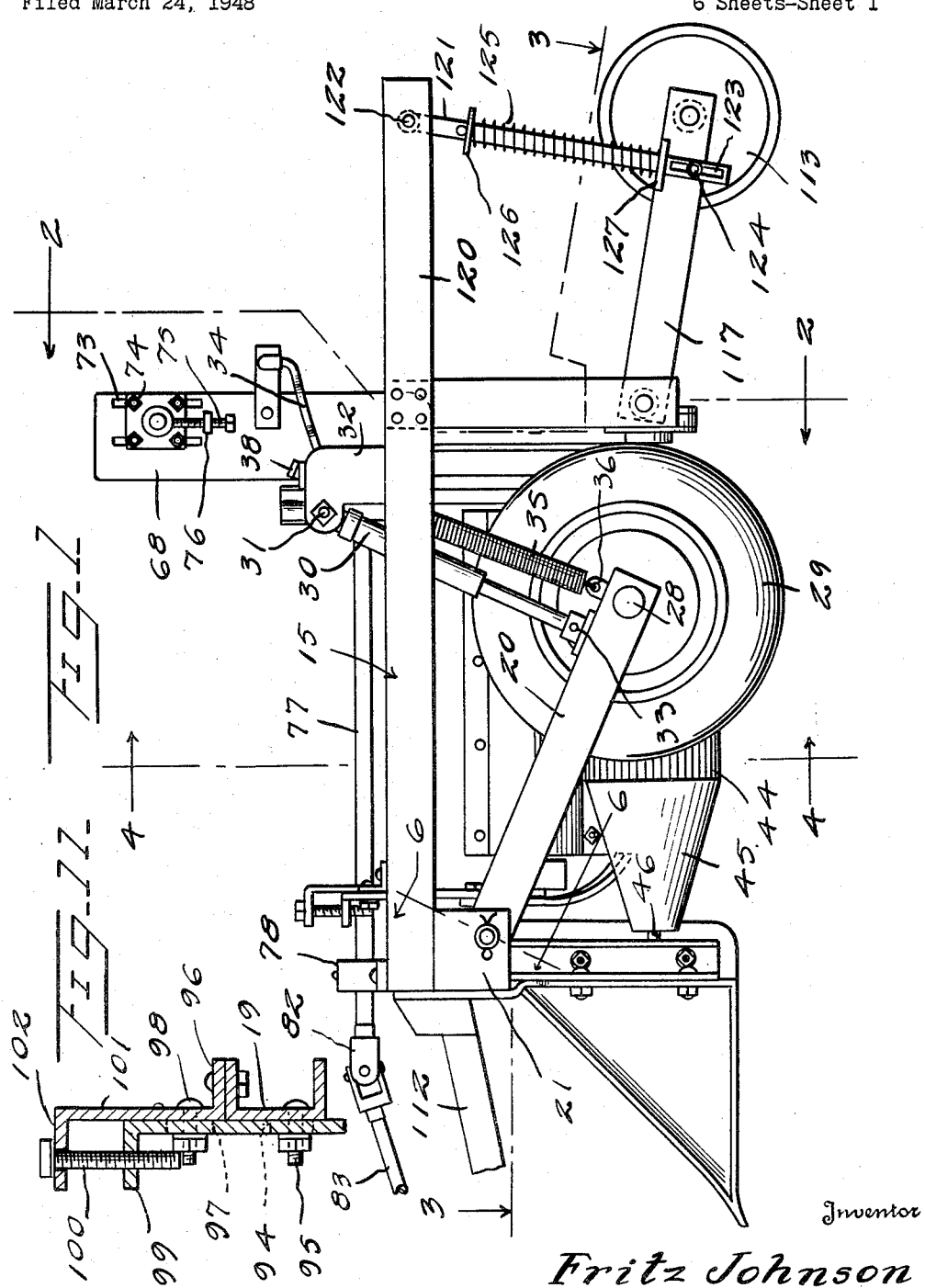

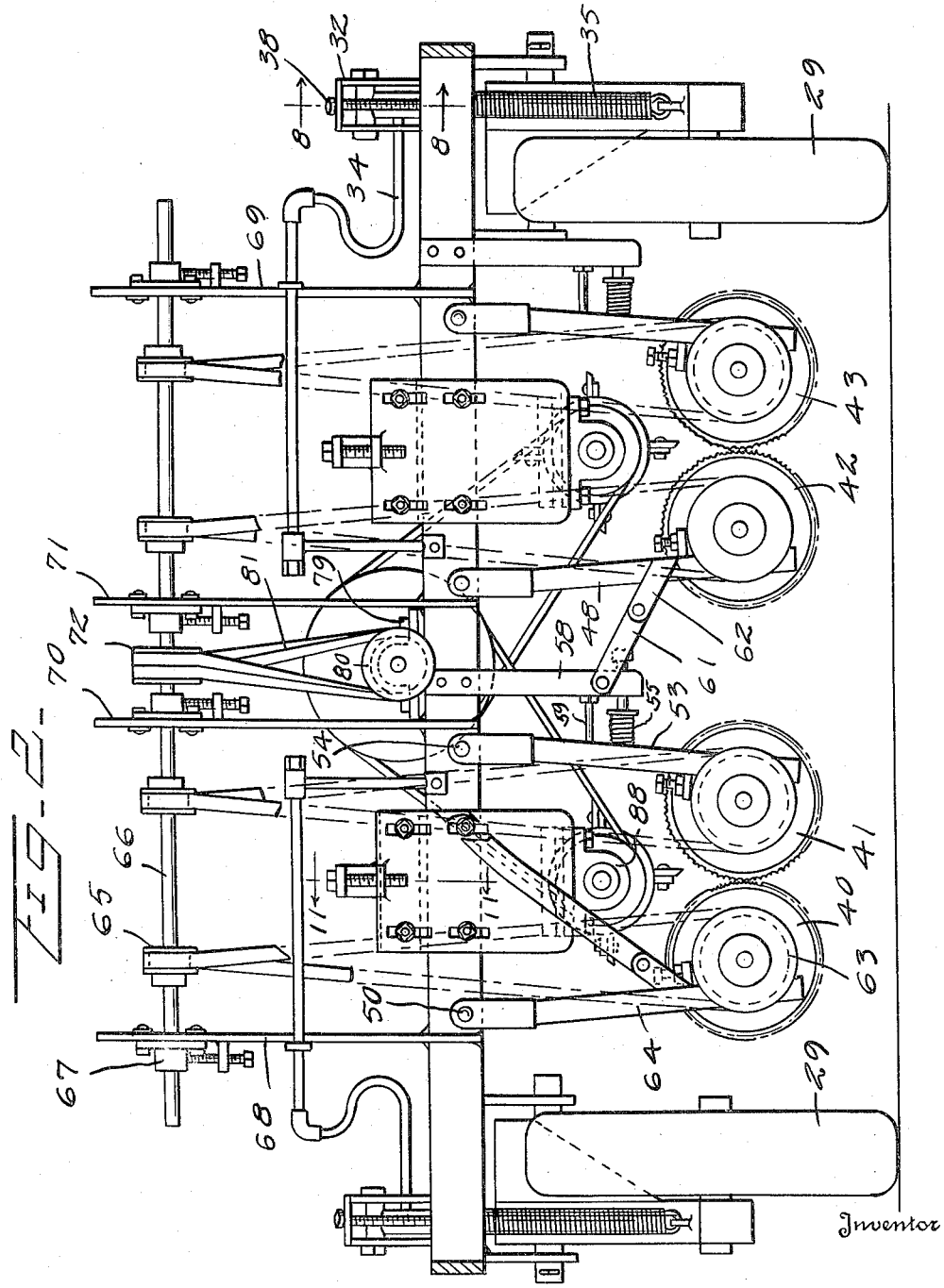

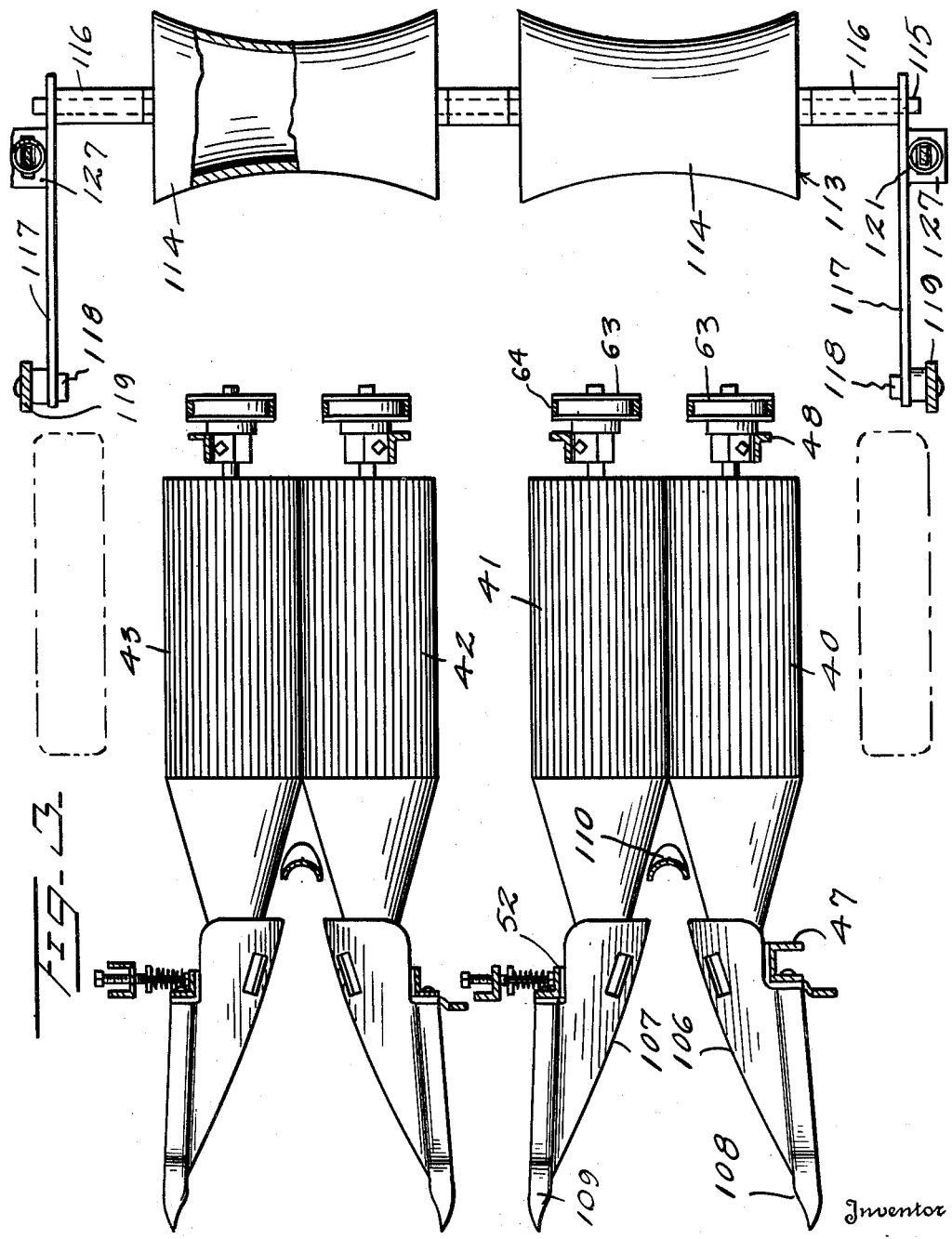

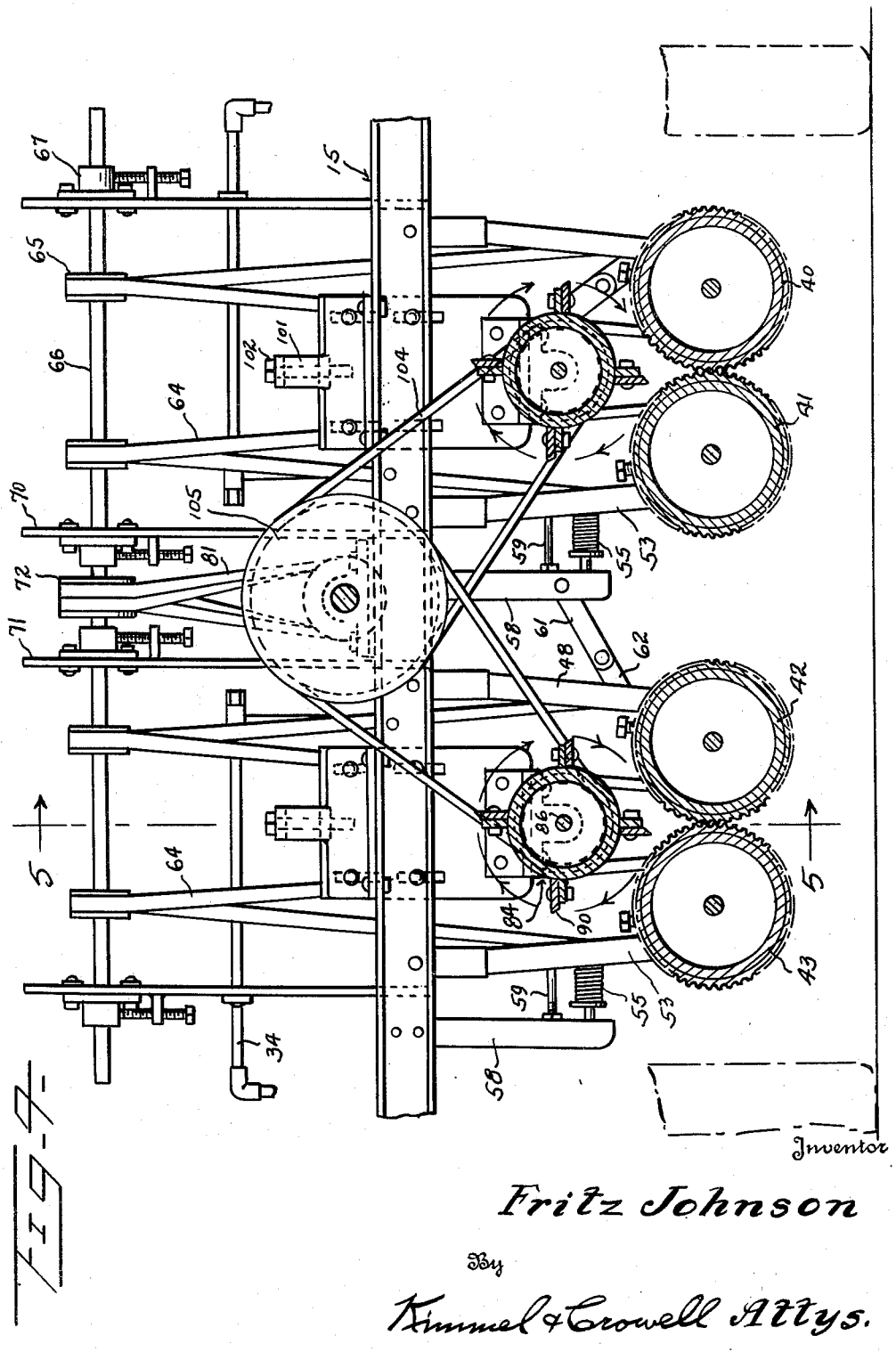

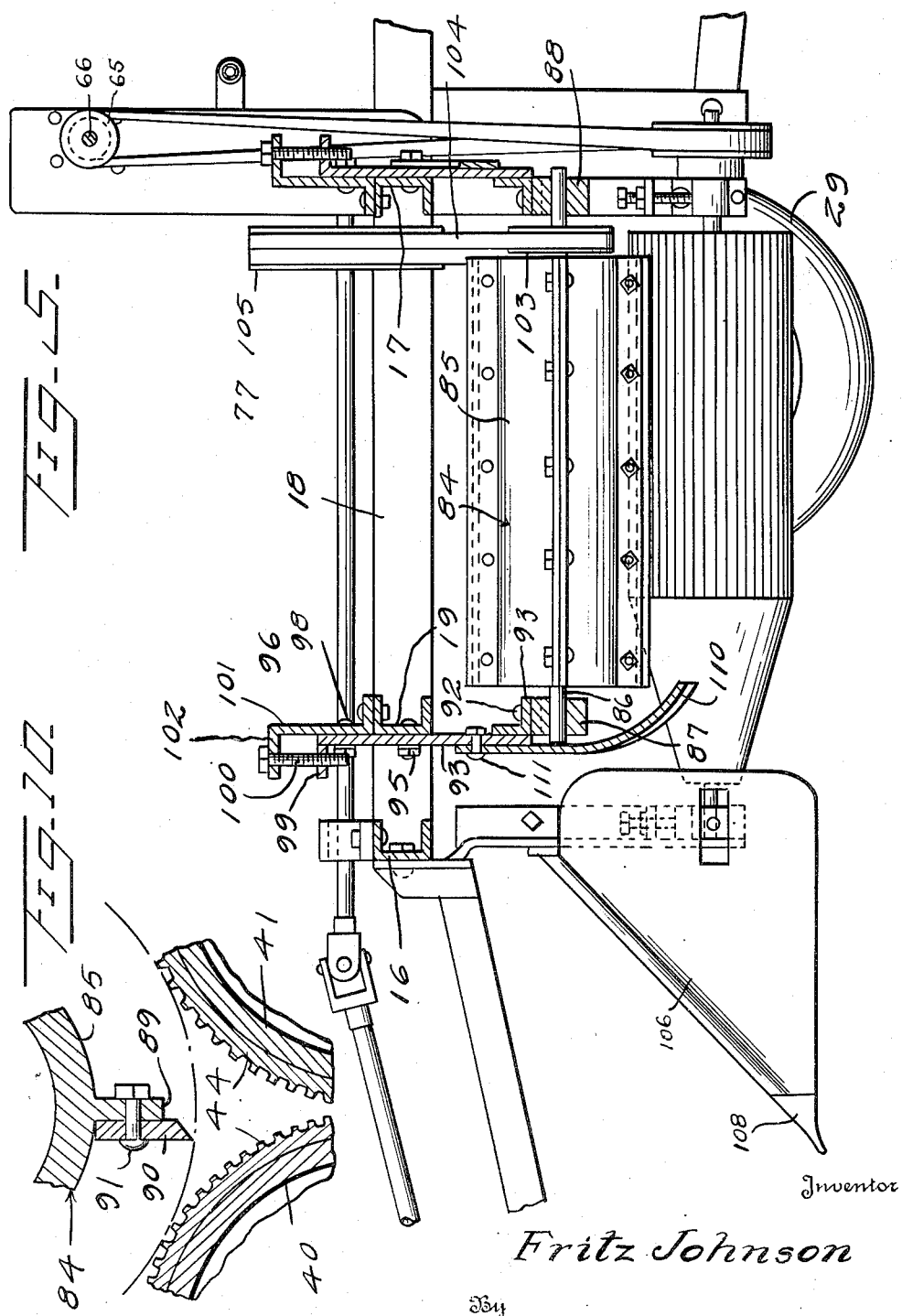

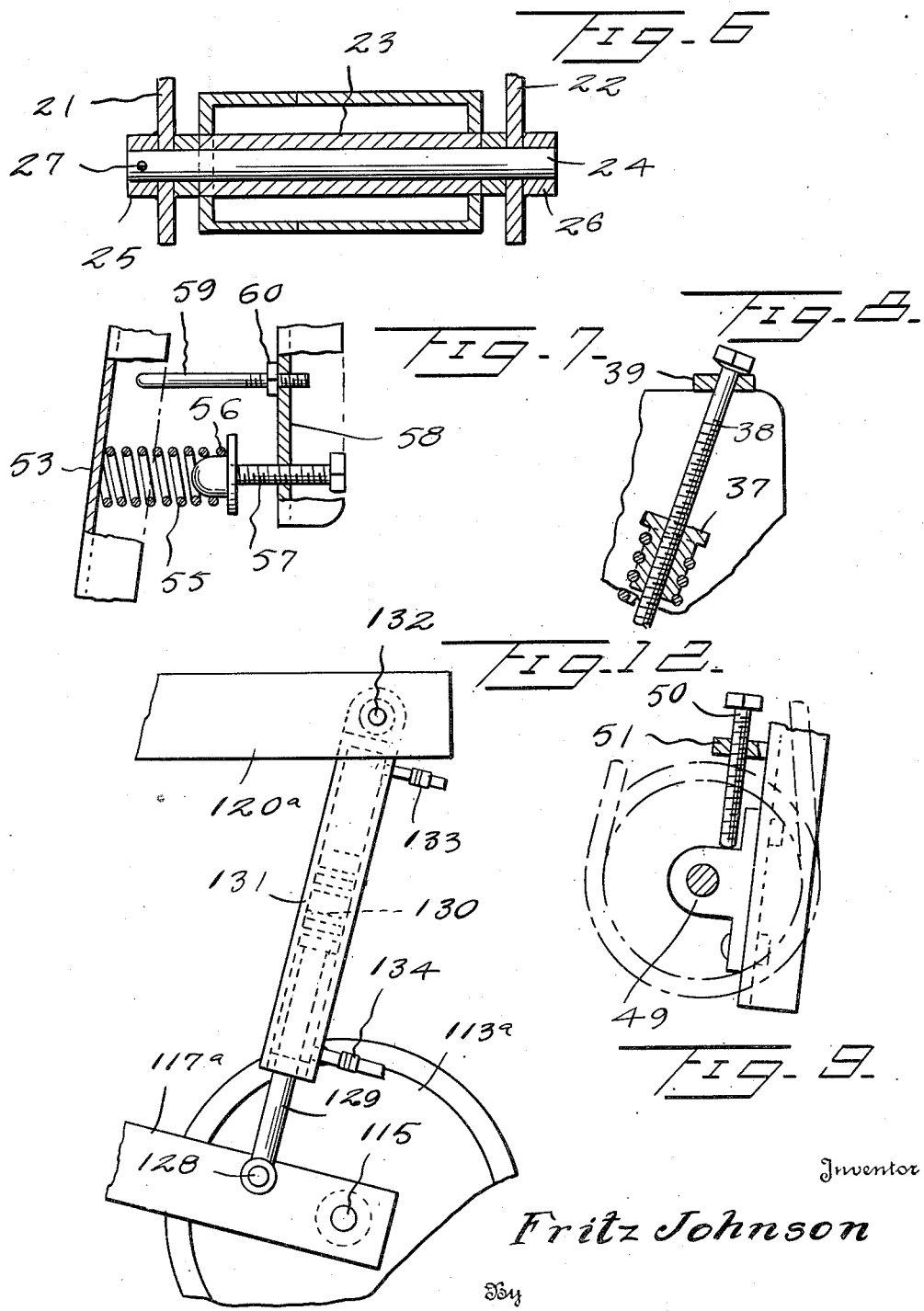

2,544,023

UNITED STATES PATENT OFFICE 2,544,023

VINE REMOVER AND CHOPPER

Fritz Johnson, Idaho Falls, Idaho

Application March 24, 1948, Serial No. 16,849

2 Claims. (Cl. 55—64)

This invention relates to a machine for pulling and comminuting potato vines, weeds or the like.

An object of this invention is to provide a machine which is so constructed and arranged that it will pull potato vines without pulling the potatoes, and will then cut up the vines and deposit the cut vines onto the ground.

Another object of this invention is to provide in combination with a vine puller and cutter of this kind rollers at the rear of the machine which will not only break up clods, but will also close the holes formed by pulling the vines so that insects or the like will not enter the ground and injure the potatoes.

A further object of this invention is to provide a machine of this kind which is so constructed that the rotary cutting member is supported above the pulling rollers so as to cut the vines while they are still gripped between the rollers.

A further object of this invention is to provide in a machine of this kind improved pulling rollers which are so constructed and rotated at such speed as to effectively pull the vines from the potatoes without breaking the vines and leaving stubs sticking above the ground.

With the use of this machine, the ripening period of the potatoes can be shortened and definitely set, as after the vines have been pulled the potatoes which are now substantially full grown are left in the ground for a week or ten days and may then be dug as fully ripened potatoes which can be immediately sacked or otherwise readied for the market.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation of a vine removing and cutting machine constructed according to an embodiment of this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a sectional view taken on the line 5—5 of Figure 4.

Figure 6 is a sectional view taken on the line 6—6 of Figure 1.

Figure 7 is a fragmentary vertical section showing one of the roller supporting and tensioning means.

Figure 8 is a fragmentary sectional view taken substantially on the line 8—8 of Figure 2.

Figure 9 is a fragmentary end elevation partly in section of one of the adjustable roller supports.

Figure 10 is a fragmentary transverse section showing the correlation between the rotary cutter and the rollers.

Figure 11 is a fragmentary sectional view taken on the line 11—11 of Figure 2.

Figure 12 is a fragmentary side elevation of a modified form of roller support carried by the rear of the mobile frame.

Referring to the drawings and first to Figures 1 to 11, inclusive, the numeral 15 designates generally a mobile frame which is formed of forward and rear transverse frame members 16 and 17, respectively, which are connected at their opposite ends to longitudinal or side frame members 18. The frame 15 also includes an intermediate channel member 19 which is disposed closely adjacent to the front cross member 16. The frame 15 also includes a pair of wheel supporting levers 20 disposed one at each side of the frame and the wheel supporting levers 20 are rockably supported between a pair of depending bearing plates 21 and 22 as shown in Figure 6. The wheel lever 20 includes a tubular bearing 23 which is welded or otherwise fixed to the forward end of the lever 20 and a shaft 24 extends through the bearing sleeve 23 and also through bearings 25 and 26 carried by the supporting plates 21 and 22, respectively. The shaft 24 is fixed against the longitudinal and rotary movement by means of a pin 27 extending through the bearing or bushing 25 which is the outer bushing.

The lever 20 has secured thereto a spindle 28, on which a wheel 29 is rotatably mounted. The frame 15 is adapted to be raised or lowered by means of a hydraulic frame adjusting member 30 which is rockably secured at its upper end on a pivot 31 extending between a pair of upstanding plates 32 which are fixed to and extend upwardly from the rear frame member 17. The hydraulic member 30 is pivotally connected as at 33 to the upper side of the lever 20 and the cylinder of the hydraulic member 30 is connected by means of a pressure line 34 to a suitable source of fluid pressure supply. In the present instance the hydraulic member 30 is a single acting hydraulic cylinder and plunger with the latter urged downwardly by discharge of fluid under pressure into the cylinder. In order to prevent the frame 15 from rocking unduly and from pulling the plunger from the hydraulic cylinder, I have provided a spring 35 which is connected as at 36 to the lever 20. The spring 35 is secured at its upper end on a nut 37 through which a spring tensioning bolt 38 is threaded. The bolt 38 is extended through a conecting plate 39 which connects the two upright plates 32 together.

The machine herein disclosed is designed to pull and simultaneously cut the potato vines or vines of other vegetables or plants by means of two pairs of pulling rollers with a rotary cutter associated with each pair of pulling rollers. As shown in Figure 2 one pair 40 and 41 of pulling rollers are rotably and suspendingly carried by the frame 15 inside the wheels 29 and a second pair 42 and 43 of pulling rollers are also rotatably and suspendingly carried by the frame 15. The supporting means together with the operating means for each pair of rollers is the same and the details of construction and operation of one pair of rollers will apply equally as well to the other pair of rollers.

The roller 40 comprises an elongated longitudinally ribbed roller body 44 which is formed at its forward end with a tapered leading end 45. The roller 44 is secured to a roller shaft 46 which is journalled in front and rear bearings which are carried by depending supporting bars 47 and 48, respectively. In Figure 12 there is disclosed one of the bearings for the rollers, the bearing being designated 49, and bearing 49 is adjusted vertically by means of a threaded bolt 50 which is threaded through an ear 51 carried by the roller supporting bar. The roller 41 is carried by front and rear supporting bars 52 and 53, respectively, which are swingably secured as at 54 to the frame 15.

Referring now to Figure 7, there is disclosed a tensioning means for the swingable roller supporting bars 52 and 53 which includes a spring 55 engaging a flanged head 56 carried by an adjusting bolt 57 which is threaded through a depending bar 58 fixed at its upper end to the frame 15. In order to provide a means whereby the outward or lateral swinging of the supporting bars 52 and 53 may be limited, I have provided a stop member 59 which is threaded through the fixed bar 58 and locked in adjusted position by means of a lock nut 60. The stop member 59 extends toward the roller supporting bar and will limit the outward swinging of the adjustable roller with respect to the associated fixed roller.

As will be noted from Figure 2, the roller 42 which is the fixed roller has the fixed supporting bar 48 thereof braced by means of bracing bars 61 and 62 which are connected together, the bar 61 being connected to the lower end of bar 58. The shaft 46 has secured thereto a pulley 63 about which a belt 64 is trained. The belt 64 extends upwardly and is trained about an upper pulley 65 mounted on a countershaft 66. The countershaft 66 is journalled through bearings 67 carried by upright plates 68, 69, 70 and 71. The plates 68 and 69 are outer plates whereas the plates 70 and 71 are inner plates being disposed adjacent the longitudinal center of the frame 15 and a pulley 72 is fixed on the shaft 66 between the plates 70 and 71. The plates 68 to 71, inclusive, are vertically slotted as indicated at 73 so that the bearing securing bolts 74 may be vertically adjusted in order to adjust the bearings 67. The bearings 67 are adjusted by means of an adjusting bolt 75 which is threaded through an ear 76 carried by each of the upright plates 68 to 71, inclusive.

A drive shaft 77 is journalled through bearings 78 and 79 carried by the frame 15 and the shaft 78 has secured thereto a pulley 80 about which one or more belts 81 are trained. The belts 81 extend upwardly and over the pulley 72. The shaft 77 has mounted on the forward end thereof a universal joint 82 with which a connecting shaft 83 is connected so that the shaft 77 may be coupled to the power take-off or other power means at the forward portion of the frame 15.

A rotary cutter, generally designated as 84, is correlated with each pair of pulling rollers being rotatably supported above each pair of rollers with the axis thereof in substantially the vertical plane of the meeting point between the members of each pair of rollers. The cutter 84 includes a cylindrical body 85 which is fixed to a shaft 86 and the shaft 86 is journalled through bearings 87 and 88 which are vertically adjustable as will be hereinafter described. The cylindrical body 85 has extending from the periphery thereof a plurality of longitudinally extending bars 89 on which cutting blades 90 are secured by fastening members 91. The blades 90 provide in addition to their cutting characteristic a fan blade means for creating a laterally moving draft of air for laterally carrying the cut vines during the rotation of the cutter 84. The bearing 87 is secured by fastening means 92 to an angle bar 93 fixed on the lower end of a vertically adjustable plate 93. The plate 93 is provided with vertically extending slots 94 through which securing bolts 95 extend. The bolts 95 extend through the intermediate transverse frame bar 19 as shown in Figure 5. The bar 19 has fixed to the upper side thereof an angle bar 96 forming an extension of the forward side of the channel bar 19 and the angle bar 96 is also provided with vertically extending slots 97 through which additional securing members 98 are extended. The upper end of the plate 93 has secured thereto a nut or threaded ear 99 through which a plate adjusting bolt 100 is threaded.

The angle member 96 has extending upwardly therefrom an upright bar 101 having a horizontally and forwardly extending upper end portion 102 through which the bolt 100 rotatably engages. The bearing 88 is adjustably supported by means similar to the supporting means for the bearing 87.

The cutter shaft 86 has fixed thereon a pulley 103 about which a belt 104 is trained and the belt 104 is also trained about a relatively large driving pulley 105 which is fixed on the drive shaft 77. In practice the cutter shaft 86 and the cutter 84 will rotate at a very substantially faster rate than the pulling rollers 40 and 41. In this manner the upwardly moving vines or plants which are drawn upwardly through the ribbed body portions of the pulling rollers will be cut into very small pieces and these pieces will be centrifugally drawn laterally of the pulling rollers by the speed of the cutter and also by the draft of air created by the cutting blades 90. In order to provide a means whereby the vines will be guided between the tapered forward ends or noses of the rollers 40 and 41, I have provided a pair of forwardly divergent guide and vine elevating members 106 and 107 which are secured at their rear portions to the supporting bars 47 and 52 for the roller bearings. The guiding and elevating members 106 and 107 include forwardly projecting fingers 108 and 109, respectively, at their lower forward ends which are adapted to engage beneath any bent or fallen vines so as to raise these vines in order that they may be guided between the guiding members 106 and 107 toward the pulling rollers. The cutter 84 has a combined guard and guide at the forward end thereof, generally designated as 110, which is fixed by means of a pair of bolts 111 to the forward side of the plate 93. The combined guard and guide extends downwardly and rearwardly into the space between the tapered forward ends of the pulling rollers. The combined guard and guide 110 will prevent any tall vines from engaging against the forward end of the rotating cutter 84 and packing or otherwise obstructing the proper operation of the cutting member 84.

The frame 15 has secured to the forward end thereof a drawbar 112 which is adapted to be secured to the rear of a tractor or other traction device so that the frame 15 may be pulled over the surface of the ground with the wheels 29 engaging in the furrows between pairs of rows of potatoes or other hilled plants.

In order to provide a means whereby the holes formed in the ground by pulling of the vines and roots may be closed or covered, I have provided a roller 113 at the rear of each pair of pulling rollers. The roller 113 as shown in Figure 3 is formed with a concave peripheral surface 114 and is mounted on a shaft 115 journalled in bearings 116 carried by rearwardly extending supporting levers 117. The supporting levers 117 are rockably mounted on pivot members 118 extending through depending bars 119 which are fixed to the rear of the frame 15. An upper horizontal bar 120 is fixed to and extends rearwardly from the frame 15, one on each side of the frame, and a downwardly extending bar 121 is pivoted as at 122 to the upper bar 120. The bar 121 is slotted at its lower end as at 123 and a pin 124 carried by the lever 117 slidingly engages through the slot 123. A spring 125 engages about the bar 121, bearing at its upper end against a fixed washer or collar 126 carried by the bar 121 and the lower end of the spring 125 bears against an ear 127 carried by the lever 117. Through the medium of the springs 125 the shaft supporting levers or bars 117 are constantly urged downwardly at their rear ends in order that the rollers 113 will be spring-pressed to engage the peaks of the hills.

Referring now to Figure 12, there is disclosed a modified form of roller supporting and operating means at the rear of the mobile frame. The roller shaft supporting levers or bars 117a through which the roller shaft 115a is journalled have secured thereto adjacent the rear lower ends thereof by means of a pivot 128 the lower end of a piston rod 129. The piston rod 129 is connected to a piston 130 slidable in a hydraulic cylinder 131 and the cylinder 131 is rockably mounted as at 132 on the rearwardly extending upper horizontal bar 120a. In the present instance the cylinder 130 is adapted to be connected adjacent the upper and lower ends thereof by means of pressure supply lines 133 and 134, respectively, to a source of pressure supply. In this manner the roller 113a may be pressed downwardly by hydraulic pressure onto the tops of the hills to the desired degree in order that the holes formed in the ground by pulling of the vines and roots will be completely closed.

In the use and operation of this device the drive shaft 77 is connected by means of the connecting shaft 83 to a source of power which may be the power take-off of a tractor. The drawbar 112 is connected to the rear of the tractor and the machine is pulled over the surface of the ground with the wheels 29 engaging in a pair of furrows between rows of potatoes or other plants. As the device moves over the ground the pulling rollers 40 and 41 which rotate in opposite directions will vertically pull the vines which are guided therebetween by the guide members 106 and 107. As the vines move vertically between and above the rollers 40 and 41, the vines or other plants will be cut into relatively small pieces by the rapidly rotating cutter 84. The cut vines will be discharged laterally of the pulling rollers being thrown laterally by the rapidly rotating cutting blades 90 and also by the draft of air caused by rotation of the cutter 84. While I have shown a machine having two pairs of pulling rollers, it will be understood that this machine may be constructed with either one pair of pulling rollers or two or more pairs of such rollers. This machine has been placed under practical test and in such test the vines have been jerked upwardly by the pulling rollers in a manner to prevent breaking of the vines as they are pulled or jerked upwardly and at the same time to break the roots at the lower ends of the vines or stalks from the potatoes. It is contemplated that this machine be used in a field prior to the harvesting of the potatoes and at a time when the potatoes are substantially full grown. The potatoes may be dug by means of conventional digging devices within a week or ten days after the vines have been pulled. By providing the covering rollers at the rear of the machine the holes in the ground will be closed so that insects, worms or the like will not go down into the ground through such holes and injure the potatoes.

The cutters 84 may be adjusted to a position closely adjacent the rotating pulling rollers so that at least one of these rollers may act as an associated cutting blade or, if desired, these cutting rollers may be adjusted a substantial distance from the pulling rollers. The vertical adjustment of each cutter will depend on the characteristic of the vines which are being pulled and cut. In other words, when the vines are green the cutter may be adjusted to one position with respect to the pulling rollers whereas when the vines are substantially dry the cutter may be adjusted to a different position with respect to the pulling rollers.

With a machine as hereinbefore described the vines will be completely pulled from the ground and separated from the potatoes so that when the potatoes are dug the potatoes may be sacked or otherwise handled without the necessity of manually removing stubs of vines which have been left on the potatoes by prior devices.

I claim:

1. A vine remover and cutter comprising a mobile frame, a pair of longitudinally ribbed mutually contacting rollers carried by and disposed lengthwise of said frame and formed with tapered forward ends, a cutter rotatably carried by said frame and disposed lengthwise of said rollers with the axis of rotation thereof within the vertical projection of the line of contact of said rollers, and means fixed relative said frame for guiding the vines toward said rollers, said latter named means including a pair of forwardly divergent guide members, and a depending combined guide and guard fixed to the frame and disposed at the forward end of said cutter and having a rearwardly bent lower portion extending between said tapered forward ends.

2. A vine puller and cutter for connection with a tractor and the power take-off of the tractor, comprising a mobile frame having a front and rear, a pair of pulling rollers disposed in side by side relation below said frame, means connected with said frame and rollers rotatably supporting said rollers with the axes thereof disposed lengthwise of said frame, an elongated rotatable cutter carried by said frame above and closely adjacent said rollers, said cutter including longitudinally disposed elongated blades, said blades extending radially of the axis of rotation of the cutter for cutting the vines pulled by said rollers and for creating a lateral draft of air to thereby blow the cut vines laterally of the frame, a pair of upstanding bearing supports carried by the rear of said frame, a countershaft, bearings for said countershaft carried by said supports, pulleys fixed relative to said rollers at the rear thereof, pulleys fixed to said countershaft, flexible driving connections between said first and second named pulleys, a drive shaft journalled lengthwise of said frame below said countershaft, a flexible driving connection between said drive shaft and said countershaft, and a driving connection between said drive shaft and said cutter.

FRITZ JOHNSON.

REFERENCES CITED

The following references are of record in the file of this patent:

UNITED STATES PATENTS

| Number | Name | Date |
|---|---|---|
| 1,205,721 | Elkins | Nov. 21, 1916 |
| 1,269,111 | Oliver | June 11, 1918 |
| 1,358,302 | Ellis | Nov. 9, 1920 |
| 1,379,571 | Jones | May 24, 1921 |
| 1,435,752 | Stiffler et al. | Nov. 14, 1922 |
| 2,314,773 | Dahlman | Mar. 23, 1943 |